J. A. BRADLEY.
NUT LOCK.
APPLICATION FILED JAN. 19, 1920.

1,349,260.

Patented Aug. 10, 1920.

Witness:
Robert Weber

Inventor:
J. A. Bradley
By
Young & Young
Attorneys

UNITED STATES PATENT OFFICE.

JACOB A. BRADLEY, OF MILWAUKEE, WISCONSIN, ASSIGNOR OF ONE-HALF TO ALBERT O. ANDERSON, OF SHAWANO, WISCONSIN.

NUT-LOCK.

1,349,260.            Specification of Letters Patent.      Patented Aug. 10, 1920.

Application filed January 19, 1920. Serial No. 352,273.

*To all whom it may concern:*

Be it known that I, JACOB A. BRADLEY, a citizen of the United States, and resident of Milwaukee, in the county of Milwaukee and State of Wisconsin, have invented certain new and useful Improvements in Nut-Locks; and I do hereby declare that the following is a full, clear, and exact description thereof.

My invention has for its object to provide a simple, economical and positive nut lock applicable for securing bolts under all mechanical conditions wherein the nuts are subject to loosening or by vibration and other causes.

With the above object in view, the invention consists in certain peculiarities of construction and combination of parts as hereinafter set forth with reference to the accompanying drawing and claim.

Figure 1:
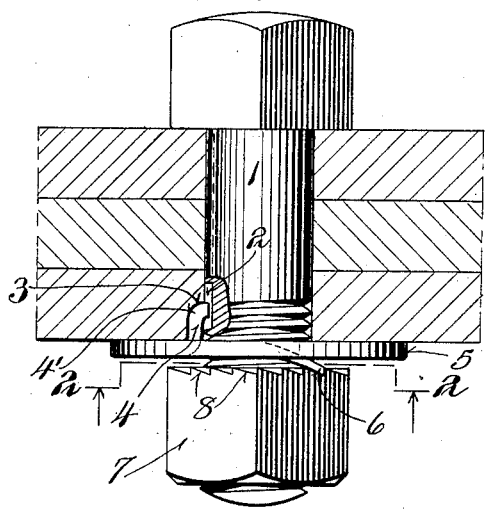
Figure 1 represents an elevation of a bolt equipped with a nut lock embodying the features of my invention, with parts broken away to more clearly show structural features and other parts in section.
Figure 2:
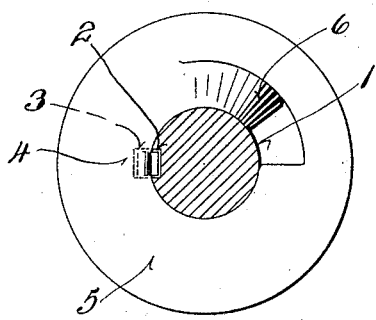
Fig. 2 is a detail sectional view illustrating the washer element of the nut lock as shown in Fig. 1, the section being indicated by line 2—2 of Fig. 1.

Referring by characters to the drawing, Figs. 1 and 2, 1 represents a bolt provided with the usual head, which bolt passes through the parts to be secured, the same being in section as shown. The bolt is provided with standard threads and in this instance the threads are interrupted by a longitudinal groove 2 for the reception of the end of the inturned end 3, constituting part of a tongue 4, which tongue is bent inwardly from the body portion of a washer 5 that is mounted upon the threaded end of the bolt. The washer 5 is also provided with a circular locking tooth 6 which is formed by cutting out a portion of the washer surrounding the bolt aperture therein. The biting head of said tooth is radially disposed with reference to the bolt and is preferably slightly upset so as to present its biting surface upon a plane slightly higher than the face of the washer, it being understood that said tooth has sufficient normal resiliency to permit yielding.

Figure 3:
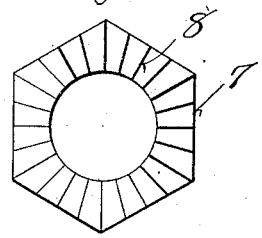
Fig. 3 is a base view of the nut showing the radial surface of two serrations thereof.

7 represents a nut of any desired type, the bottom face of which is provided with a series of saw-tooth serrations 8, the same being cut radially with respect to the axis of the nut, as best shown in Fig. 3. These serrations have their inclined faces extending in the direction of rotation of the nut upon the thread bolts when the nut is turned down. Hence as shown in Fig. 1, when the nut reaches a predetermined position with relation to the washer, the tooth 6 will engage the serrated teeth 8 and as the nut is turned completely down, the tooth 6 will ride over the inclined faces successively so as to lock or seat within the tooth serrations to prevent turning off of the nut after it has once been drawn tight. As shown in Fig. 1 the extreme end of the locking tooth 6 is swaged slightly thinner than the washer and hence when it is desired to remove the nut, as may be the case in some instances, this tooth may be pressed inward by a suitable tool to disengage the serrations of the nut whereby the same may be removed. To prevent rotation of the bolt, I provide the washer with a tongue 4 which is bent as previously stated inwardly. The body of this tongue is thus adapted to nest within a recess 4' that is formed in one of the members to be secured by the bolt. The extreme end of the tongue projects out of the recess and into engagement with the groove 2 of the bolt, it being forced into the aforesaid groove due to its engagement with the bottom of the recess. Hence when the washer is put into place, it will be locked to the bolt and thus prevent turning of the same when the nut element is turned down.

I claim:

In a pair of elements adapted to be bolted together comprising a facing element having a bolt recess therein and a locking washer recess; the combination of a bolt extending through the element having a longitudinal groove adapted to be alined with the washer recess of the facing plate, a washer fitted to the bolt provided with a tongue extending from its upper face, a lug extending from the lower face for engagement with the washer recess of the parts to be confined, the lug being provided with an inturned end engageable with the bolt groove, and a nut provided with a saw-tooth lower face for locking engagement with the washer tooth whereby the bolt, washer and nut are locked against turning relative to the face plate.

In testimony that I claim the foregoing I have hereunto set my hand at Milwaukee in the county of Milwaukee and State of Wisconsin.

JACOB A. BRADLEY.